Wm. Pettit

2 Sheets. Sheet I.

Connecting Cars to Trucks

4238

REISSUED JAN 24 1871

Witnesses

Albert S. L. Shields

Edgar L. Thomson

Inventor

William Pettit

By his Attorney

Franklin E. Felton

2 Sheets Sheet II

Wm. Pettit

Connecting Cars to Truck.

Witnesses
Albert S. L. Shields
Edgar L. Thomson

Inventor
William Pettit
By his Attorney
Franklin E. Fe

THE ECKERT LITHOGRAPHING CO., WASHINGTON, D. C.

United States Paten Office.

WILLIAM PETTIT, OF PHILADELPHIA, PENNSYLVANIA.

Letters Patent No. 38,980, dated June 23, 1863; reissue No. 4,238, dated January 24, 1871.

IMPROVEMENT IN RAILWAY CAR-TRUCKS.

The Schedule referred to in these Letters Patent and making part of the same.

I, WILLIAM PETTIT, of the city of Philadelphia, and State of Pennsylvania, have invented a mode of connecting locomotive-engines and railway cars to their trucks, and I denominate my invention "The Curve-Traversing Safety-Truck for Locomotives and Cars."

The object of my invention is to connect a locomotive-engine or railway car to its truck in such a manner as to enable the truck to accommodate itself to the curves of the road, by the length of the leverage being increased between the point where the front wheels are in contact with the rails and the center-pin in the rear part of the truck, by which arrangement the truck is guided to the curve with little or no abrasion between the wheels and the rails.

*Description of the Accompanying Drawing.*

Figure 1:
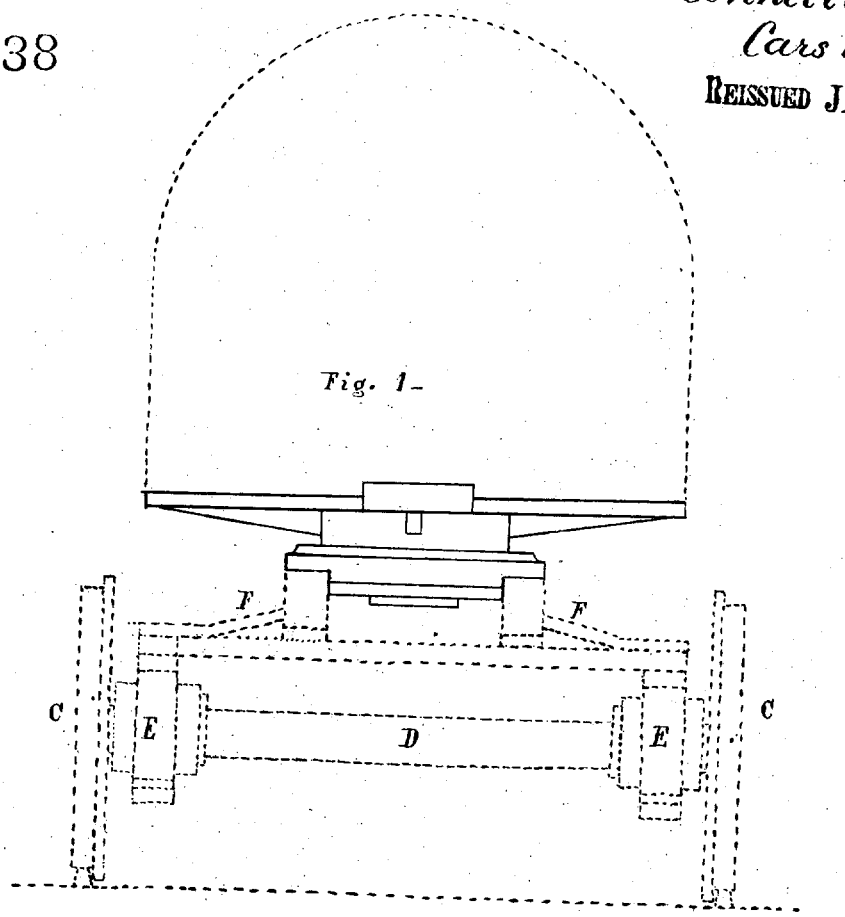
Figure 1 is a front view of my invention as applied to the truck of a locomotive-engine.
Figure 2:
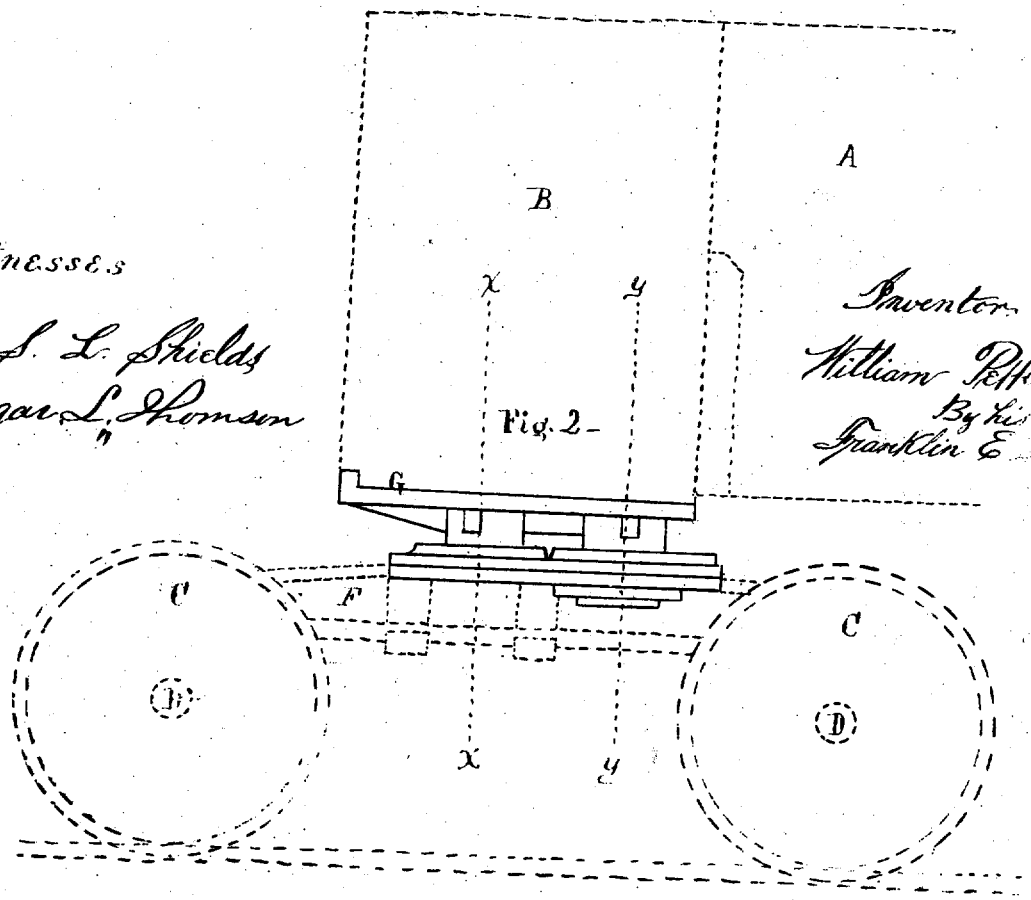
Figure 2 is a longitudinal view of fig. 1.
Figure 3:
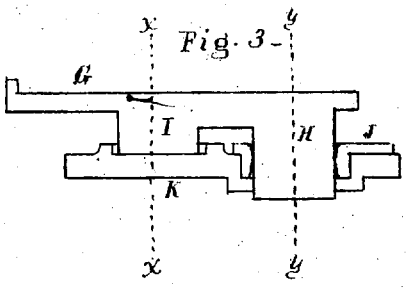
Figure 3 is a vertical section of my improvement.
Figure 4:
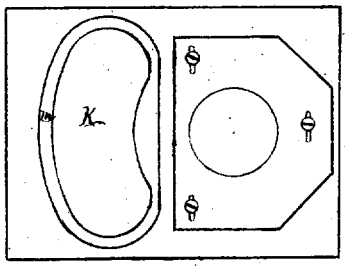
Figure 4 is a plan view of the under plate, fig. 3.

A, fig. 2, represents the rear end of the body of a locomotive-boiler;

B being the smoke-box.

C C are the usual railway wheels, secured to the ordinary axles D, which turn in suitable boxes fitted to pedestals or hangers, E E, the latter being secured to the under side of the truck-frame F.

Figure 5:
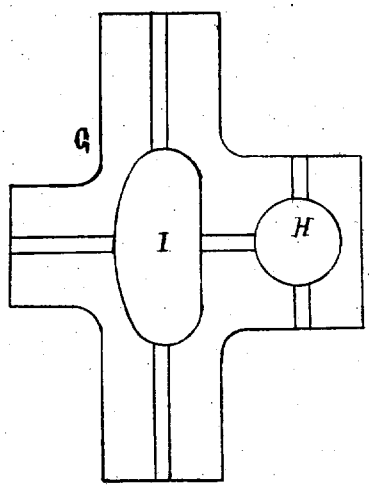
Figure 5 is an inverted plan view of the upper plate, fig. 3.

To the bottom of the smoke-box B is secured the plate G, on the under side of which are two projections, H and I, as best observed on reference to the inverted plan view, fig. 5, the projection H consisting of a cylindrical pin, which fits snugly, but so as to turn freely in an opening in the plate J, this plate being fitted and secured to the plate K secured to the truck F of the locomotive.

This center-pin H may be cored out and a safety-bolt may be inserted therein, and passing through the same may be secured by means of a washer and key or otherwise, by which arrangement, in case the center-pin should be fractured, the safety-bolt would continue to hold the locomotive or car to its truck and prevent accident.

It is usual to put the center-pin through the center of a locomotive-truck, and to insert the king-bolt through the center of a car-truck, but according to my plan, in both locomotives and cars, the center-pin and king-bolt together pass through the rear center section of the truck, by which arrangement the wheels readily conform to any curvature of the track whereby undue pressure and abrasion against the rails are avoided.

The wear and tear of both wheels and rails are thus greatly diminished by being relieved of the immense strain to which they are now subjected from the use of trucks as ordinarily constructed.

The weight of the locomotive or car is received by the plate K, on which is formed a recess, *k*, by the curved flange *m*, superimposed on the plate K.

On the inner surface of the recess rests the curvilinear projection I, extending downward from the plate G, and capable of moving laterally within said recess, in order that the truck of the locomotive or car may have such free play as to conform to any curvature of the track.

Said recess may contain any suitable lubricator for the bearing surfaces.

The peculiar conformation of the recess prevents the turning of the truck beyond a point which is necessary for the most abrupt curve.

My invention is equally applicable to locomotive-tenders as to locomotive-engines and railway cars.

I claim as my invention—

Arranging the center-pin which connects a railway car or locomotive-engine and tender to the truck, and around which center-pin the truck turns, in a position to the rear of the center of the truck and between the two axles of the same, in the manner and for the purposes herein set forth.

WILLIAM PETTIT.

Witnesses:

FRANKLIN E. FELTON,

EDWARD K. WORRELL.